Jan. 17, 1950 W. A. ANDERSON 2,494,854
PIPE COUPLING
Filed Jan. 27, 1947 2 Sheets-Sheet 1

INVENTOR.
William A. Anderson
BY
Glenn L. Fish
ATTORNEY

Patented Jan. 17, 1950

2,494,854

UNITED STATES PATENT OFFICE 2,494,854

PIPE COUPLING

William A. Anderson, Spokane, Wash., assignor to Anderson-Miller and Poston Mfg. Co., Spokane, Wash.

Application January 27, 1947, Serial No. 724,538

1 Claim. (Cl. 285—172)

My present invention relates to an improved pipe coupling and especially to the structure permitting a quick and easy attachment and detachment.

The coupling of my invention is especially adapted for use in farming areas where irrigation or mechanical moisture transfer methods are necessary and in the latter uses with large areas to be sprinkled it is imperative that the piping systems be movable from one place to another and that they be quickly and easily assembled and disassembled.

In the accompanying drawings I have illustrated one complete example of the physical embodiment of my invention according to the best mode I have thus far devised, but it will be understood that various changes and alterations may be made in the exemplified structure within the scope of the appended claim.

Figures 1, 2, 3:
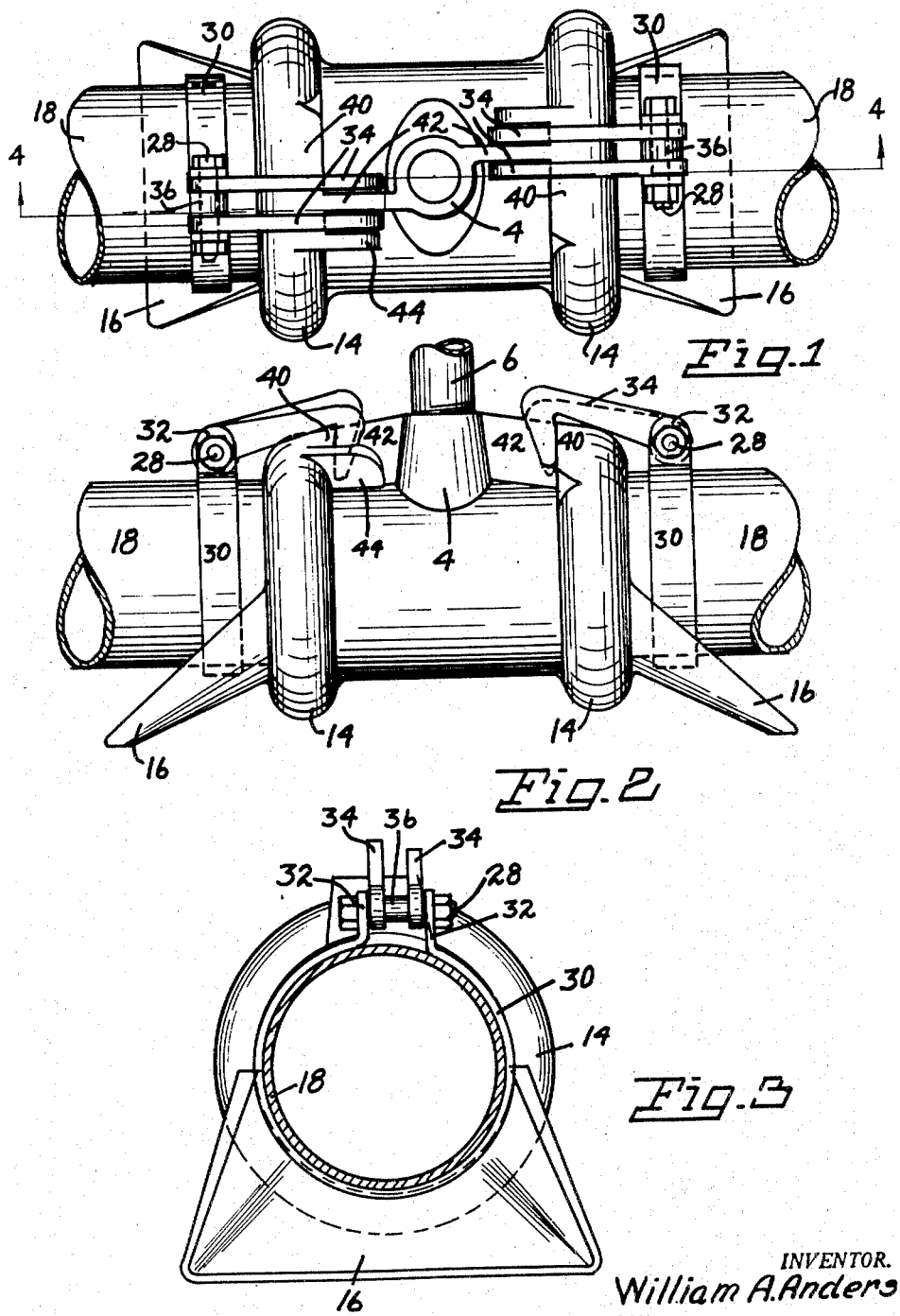
Fig. 1 is a top plan view of the joint showing the unit into which two pipe ends are secured.
Fig. 2 is a side elevational view thereof.
Fig. 3 is an end elevational view.

Referring now to the drawings wherein I have illustrated one form of the preferred embodiment of my invention, I use a cylindrical body 2 having a threaded nipple 4 to receive a sprinkler pipe 6. An interior annular flange 8 forms shoulders 10 and 12 and beyond the shoulders the body is fashioned with annular outwardly extending ribs 14 forming semi-cylindrical interior grooves or recesses.

To support the coupling on the ground in upright position I employ at each end, supports 16.

Pipes 18 are positioned in the coupling abutting the shoulder and to seal these pipes I use a gasket of rubber or other suitable material comprising a closed ring 20 with an arcuate outer surface 22 and an elongated tapered portion 24, the inner wall 26 of which converges normally.

Figure 4:
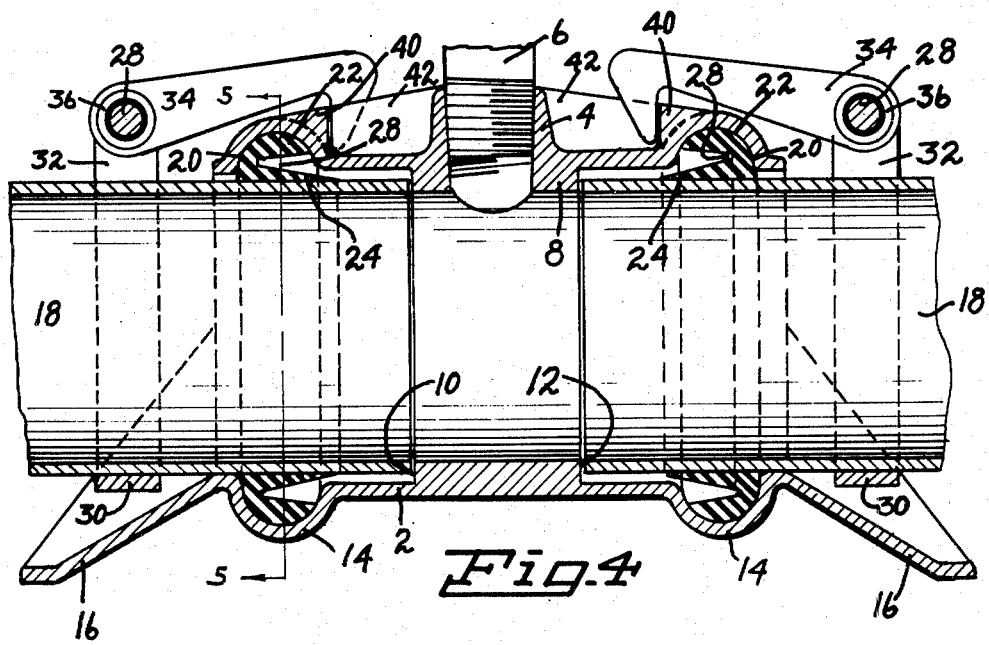
Fig. 4 is a sectional view on line 4—4 of Fig. 1.
Figure 5:
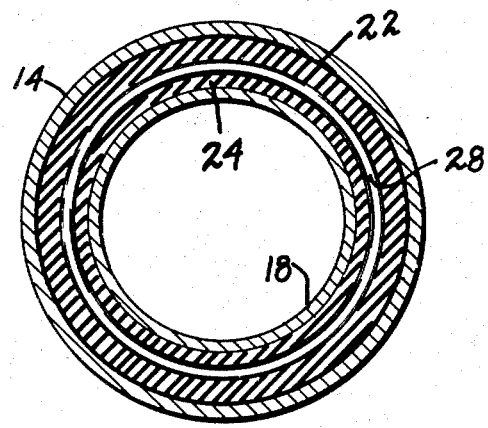
Fig. 5 is a sectional view on line 5—5 of Fig. 4.
Figure 6:
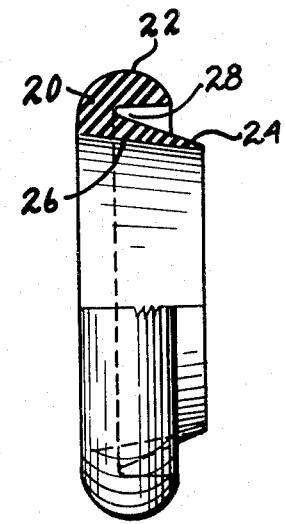
Fig. 6 is a view of the rubber gasket partially shown in section.

A V-groove 28 separates a part of the arcuate portion from the tapered portion and as seen in Figs. 4 and 5 when the pipe is inserted into the coupling the portion 24 of the gasket will be pressed radially until the wall 26 is parallel with the pipe.

The V-groove is reduced but will seal the joint under pressure of water leaking and passing between the shoulders of the pipe ends.

Each pipe section is provided with a ring 30 having parallel ends 32 and a pair of hooks 34 spaced by washer 36 on bolt 28 are adapted to ride over the ribs 14 and engage the abutments 40 of the body. Strengthening ribs 42 extend tangentially of the nipple 4 to the ribs 14 and form spacing means for the ends of pairs of hooks, and guide ribs 44 insure the alignment of the hooks.

It will be apparent that as the operator balancing perhaps a twenty foot pipe section of aluminum or other lightweight material inserts one end into the open end of the coupling, the gasket will automatically seal the pipe and the hooks will ride over the annular ribs engaging the abutments. Thus one person may quickly and easily connect pipe sections from a point distant from the coupling, and the joined coupling may be disassembled by lifting the hooks and pulling out the pipes.

Having thus fully described my invention what I claim as new and desire to secure by Letters Patent is:

In a detachable coupling for pipe ends, the combination with a cylindrical coupler having an inner annular flange forming spaced shoulders for the abutting pipe ends and an exterior nipple opening to the interior of the coupler, annular exterior ribs on the coupler forming interior grooves, and resilient sealing gaskets within the grooves surrounding the pipe ends, of a pair of oppositely extending longitudinal ribs uniting the annular ribs with the nipple and inwardly projecting guide ribs integral with the annular ribs, a pair of supporting rings clamped on the pipe ends, and a pair of inwardly extending latch-hooks pivotally mounted on each clamp ring and in frictional engagement with the inner side of an annular rib.

WILLIAM A. ANDERSON.

REFERENCES CITED

The following references are of record in the file of this patent:

UNITED STATES PATENTS

| Number | Name | Date |
|---|---|---|
| 2,087,916 | Lanninger | July 27, 1937 |
| 2,251,651 | Ames et al. | Aug. 5, 1941 |